Figure 1:
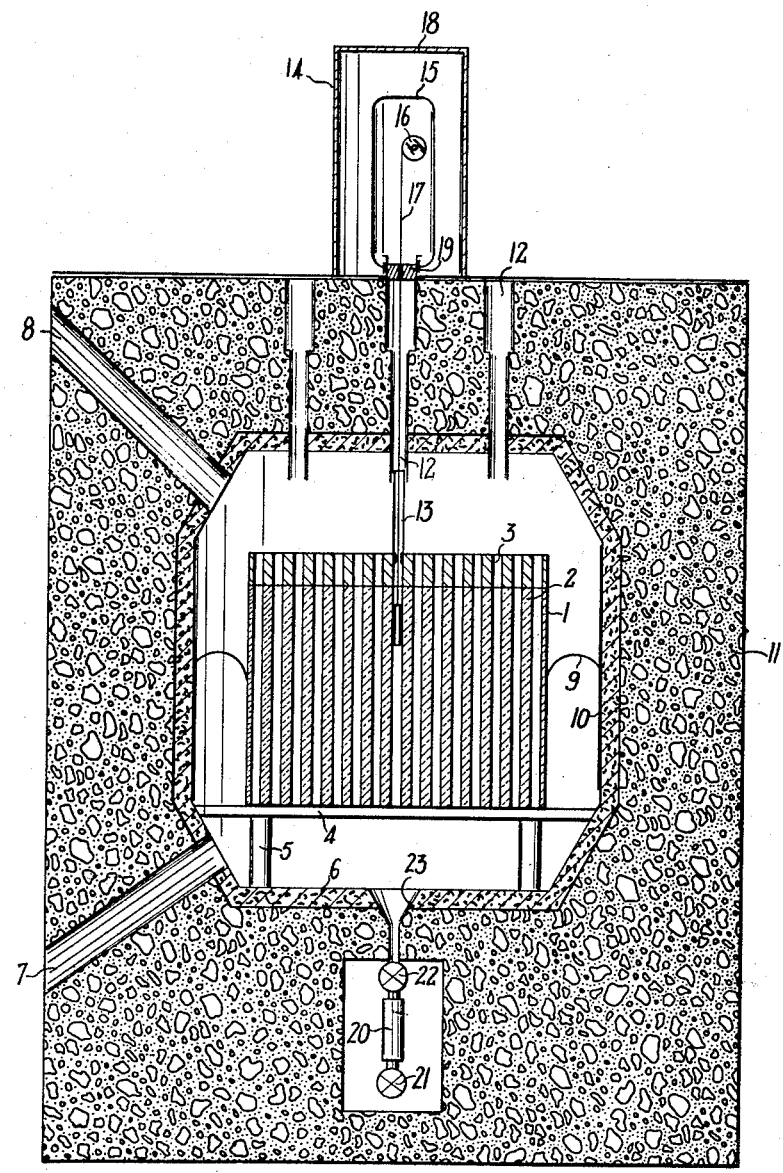

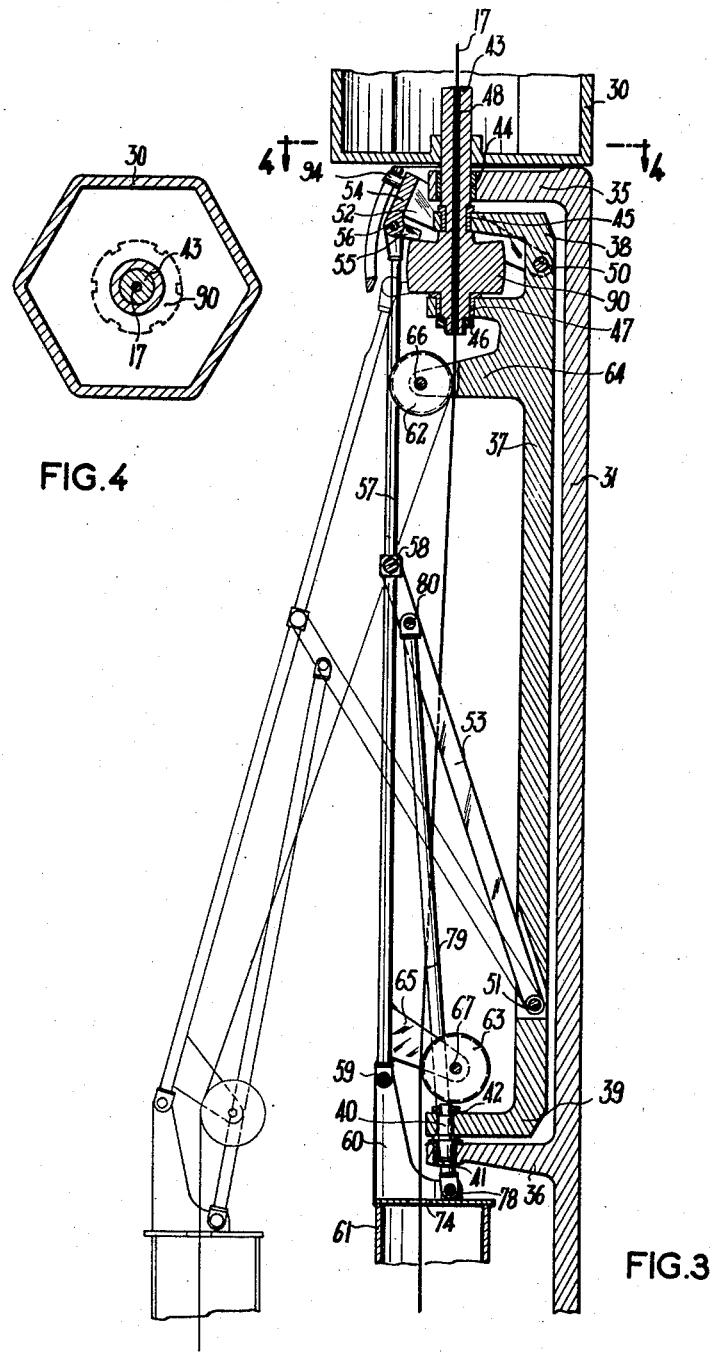

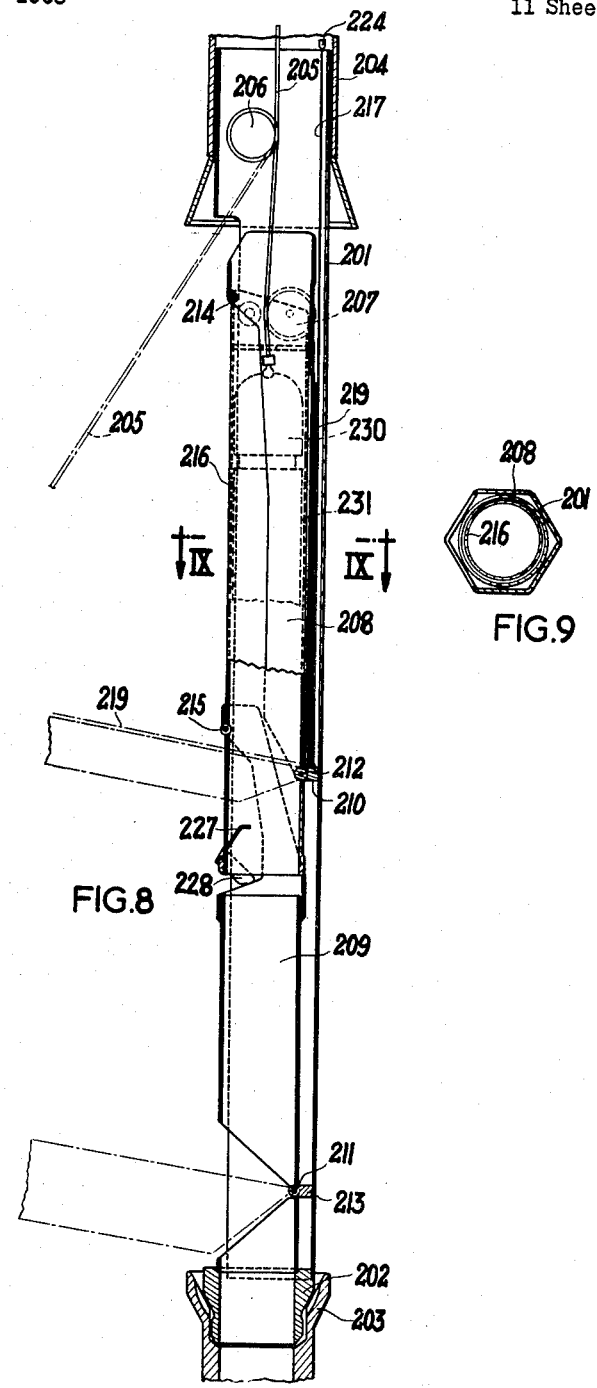

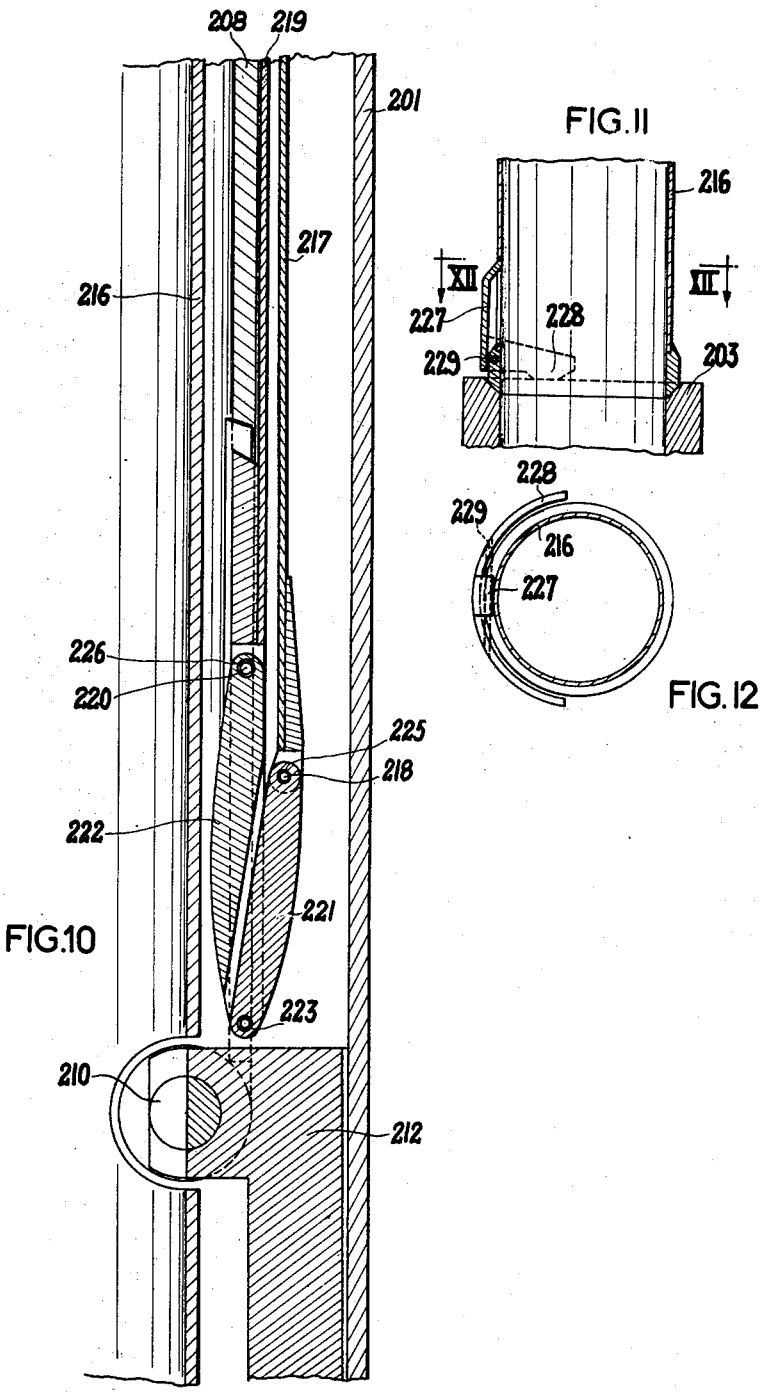

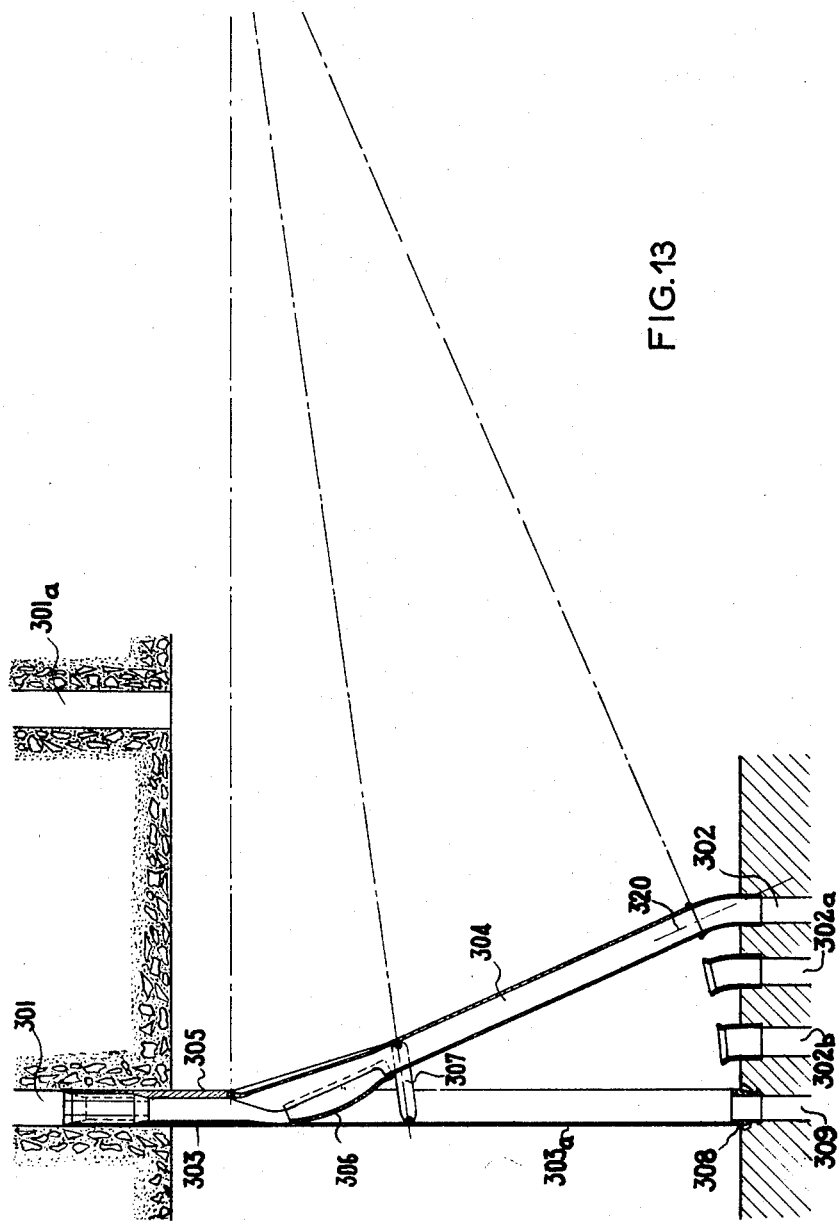

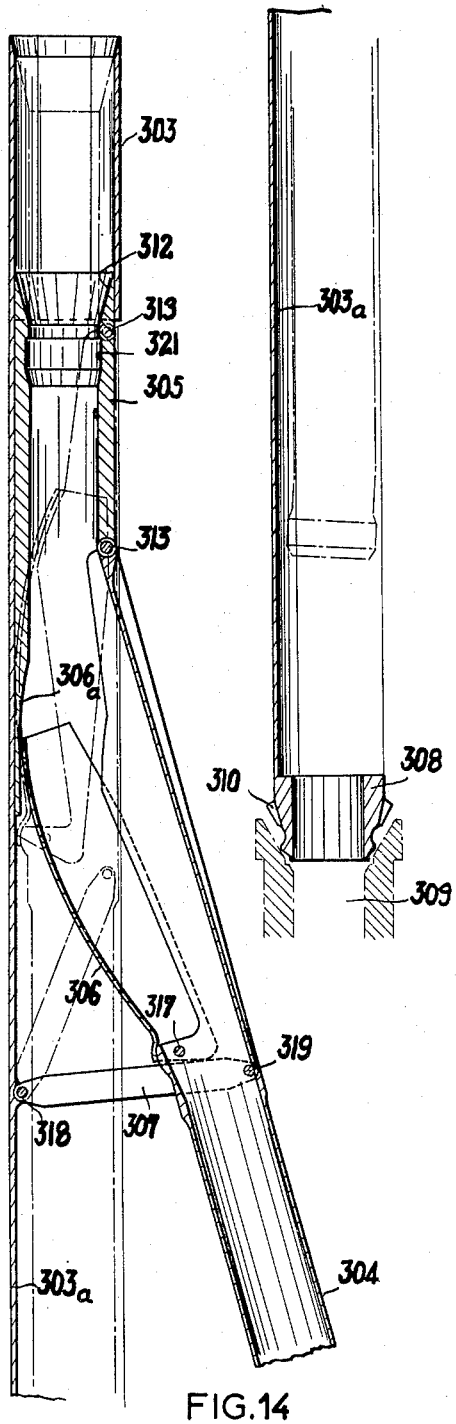
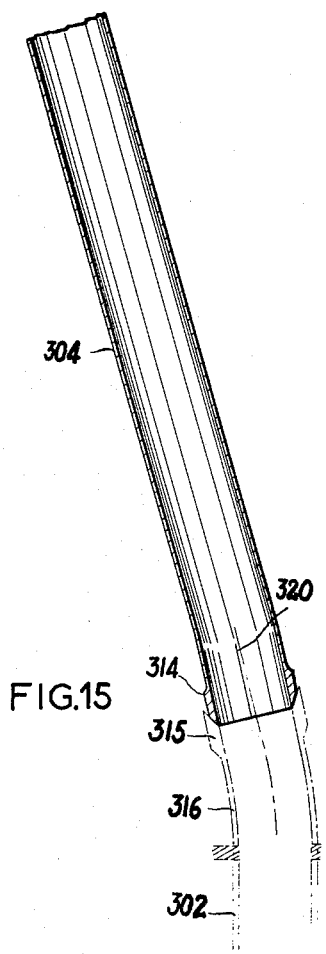
FIG.15
FIG.14

DEVICES FOR HANDLING FUEL ELEMENTS IN A NUCLEAR REACTOR

André Gumuchian and Alain Virnot, Paris, France, assignors to Society Indatom and Compagnie des Ateliers et Forges de la Loire, Paris, France
Filed Mar. 22, 1963, Ser. No. 267,127
Claims priority, application France, Mar. 23, 1962, 892,125; Aug. 23, 1962, 907,671, 907,624; Feb. 5, 1963, 923,815; Feb. 8, 1963, 924,256
10 Claims. (Cl. 176—30)

The present invention relates to nuclear reactors and is more especially concerned with a method and devices for the practical application of said method which permit the loading and unloading of fuel elements in said reactors.

The devices of this type which have been employed up to the present time usually comprise a "loading arm" consisting of two co-axial tubes which are made fast for rotation with respect to each other while nevertheless being capable of sliding one inside the other. The outer tube is provided at the bottom portion thereof with an articulation which couples the said tube to a movable chute which is in turn pivotally attached to a link-rod, the said link-rod being also coupled to the terminal portion of the inner tube. This arrangement accordingly makes it possible either to produce a radial displacement of the chute as a result of the translational movement of one tube relatively to the other or an angular movement of the combined unit about the axis of the tubes as a result of the simultaneous rotation of these latter. In order to put a device of this type into operation, the reactor is provided with a certain number of openings or "fuel access tubes" through which the above-mentioned arm is inserted and which perforate the tank or leak-tight vessel containing the active portion. By combining the movements of radial displacement and rotation of the chute, this latter can accordingly be assigned to a definite number of reactor channels, the openings of the said channels being distributed over a "handling zone" about the axis of the fuel access tube considered.

The disadvantages of this device essentially reside in its overall size, its weight and its complexity which make the various handling operations fairly difficult and substantially increases the overall cost price of the installation. It is in fact necessary to employ in an apparatus of this type a machine of substantial height in order to effect the translation of the loading arm and the insertion thereof either in one fuel access tube or in another, and servo-control mechanisms for controlling the various movements of the arm which are necessary for the positioning thereof in the various channels to be explored.

The purpose of the present invention is to provide a remedy for the disadvantages referred-to above by virtue of a device of very simple design and small overall size which permits of easy operation in accordance with a particular method of handling.

This handling device is characterized in that it comprises, supported by a cable fitted at the extremity thereof with a handling gripper, a frame of which one portion forms a stop for the purpose of centering the device and a deformable system for guiding the fuel elements which is held in collapsed position inside the frame by the tractive force of the cable which results from the weight of the device, the said deformable guiding system being adapted to expand outwards from said collapsed position up to a predetermined angular distance as and when the said frame is brought into abutment, under the action of the reduction in the tractive force of the cable which results from said abutment.

As an advantageous feature, the frame is constructed of two superposed sections, the first section being constituted by a sleeve having a cross-section in the shape of a regular polygon and the second section being constituted by a rigid upright member disposed in the line of extension of said sleeve and supporting at the bottom extremity thereof the frame-centering stop.

In a first form of embodiment of the invention, the deformable system is constituted by an assembly of link-rods which are connected to each other in such manner as to form an articulated quadrilateral supporting a protective carriage which surrounds the handling gripper and which is open at the bottom portion thereof in order not to interfere with the passing of fuel elements. In a first variant of this form of embodiment, two summits of the articulated quadrilateral are disposed on a supporting armature which is movably mounted about the axis of the frame in such manner as to permit at the same time the radial opening of the articulated quadrilateral and a movement of rotation of this latter about the said axis through an angle which is determined by the profile of a cam mounted on the frame.

In a second alternative form, the link-rods of the deformable system form a parallelogram, two summits of which are directly articulated on the rigid upright member of the frame, the angle of opening of the parallelogram being always the same, in such manner as to ensure the positioning of the bottom portion of the protective carriage in a circle of given radius about the axis of the frame.

In another form of embodiment, the deformable guiding system is constituted by a continuous connecting conduit preferably comprising a slide tube which is movable inside the sleeve of the frame and a connector-pipe pivotally mounted on the slide tube, the angle of opening and the radial displacement of the said connector-pipe being produced by means of at least one link-rod of given length which is pivotally attached respectively to the connector-pipe and to the frame.

The handling device in accordance with the invention is additionally characterized by further secondary arrangements which will be explained in greater detail below and which relate especially to the practical utilization of various safety systems with a view to effecting on the one hand the folding-back of the deformable system to the collapsed position thereof and the positioning or withdrawal of the frame in the event of rupture of the supporting cable and with a view on the other hand to preventing any possibility of release of a fuel element from a gripper during the movements of transfer of the device or of radial displacement of the deformable system.

In accordance with the present invention, the practical operation of the handling device referred-to above is carried into effect in accordance with a particular procedure which essentially consists in lowering inside one of the fuel access tubes which pass through the reactor shield the frame which supports the deformable system for guiding fuel elements, the unit constituted by said frame and said deformable system receiving prior to the lowering thereof information which corresponds, in one-to-one relation, to the coordinates of the fuel channel to be serviced with respect to the axis of the fuel access tube which is employed and storing said information during the downward movement of said unit, in causing the abutment inside the reactor shield of a portion of the frame in such manner as to effect, subsequently to the said downward movement, the radial movement of the deformable system until said deformable system is placed in position directly above the fuel channel to be serviced.

Further characteristic features and advantages of the present invention will become more readily apparent from the description which follows below and which relates to a number of examples of construction which are given by way of indication and not by way of limitation.

Figure 2:
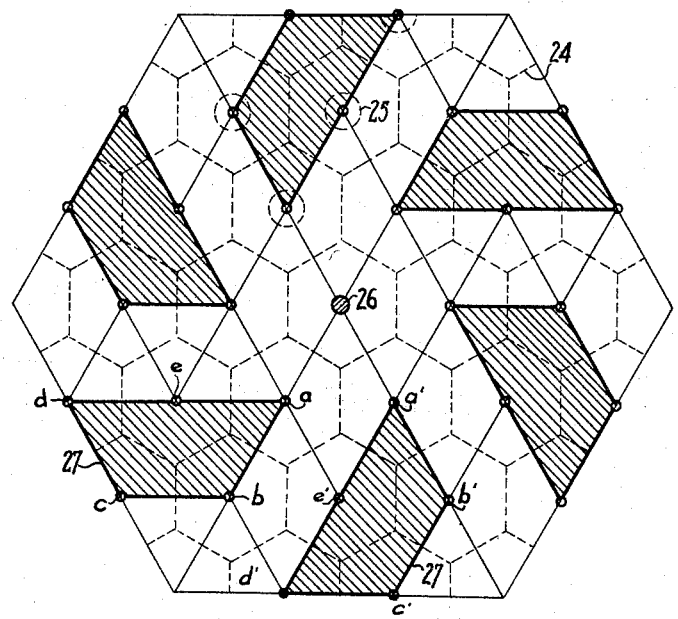
Figure 5:
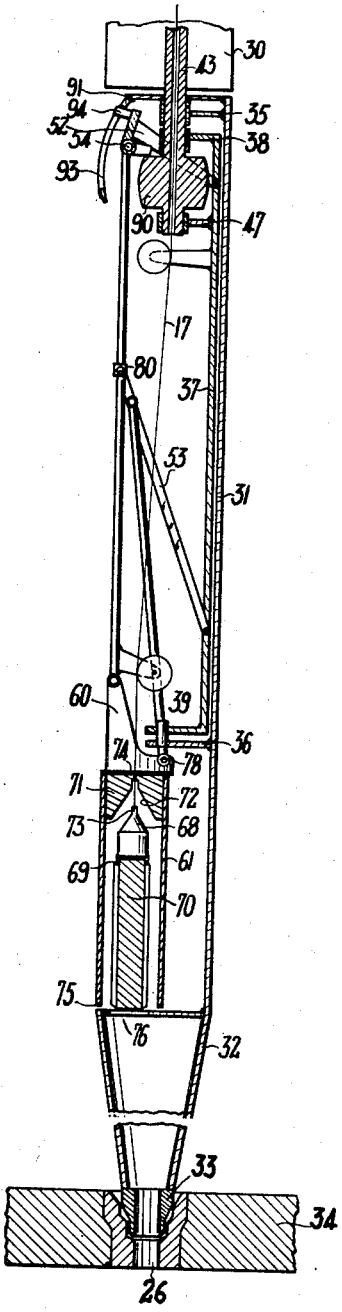
Figure 6:
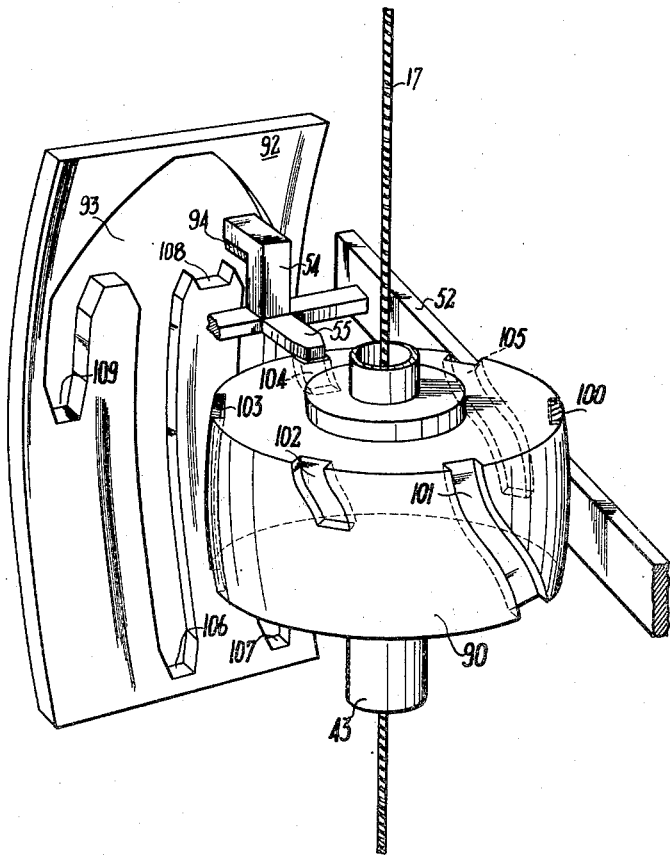
Figure 7:
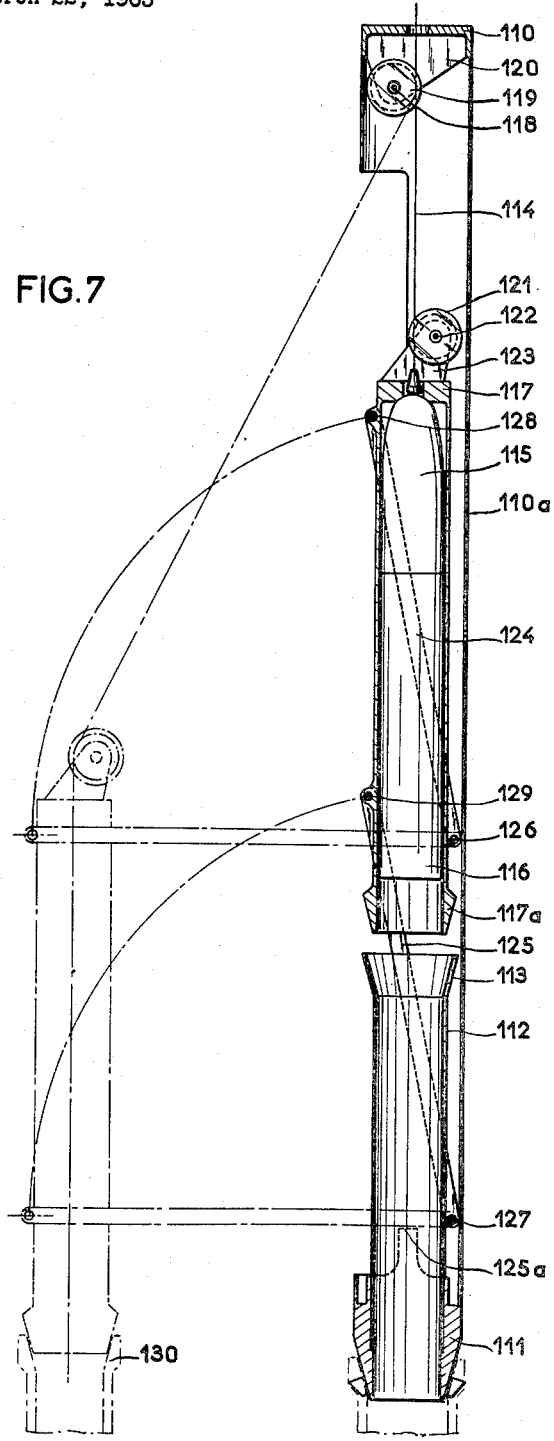
Figure 16:
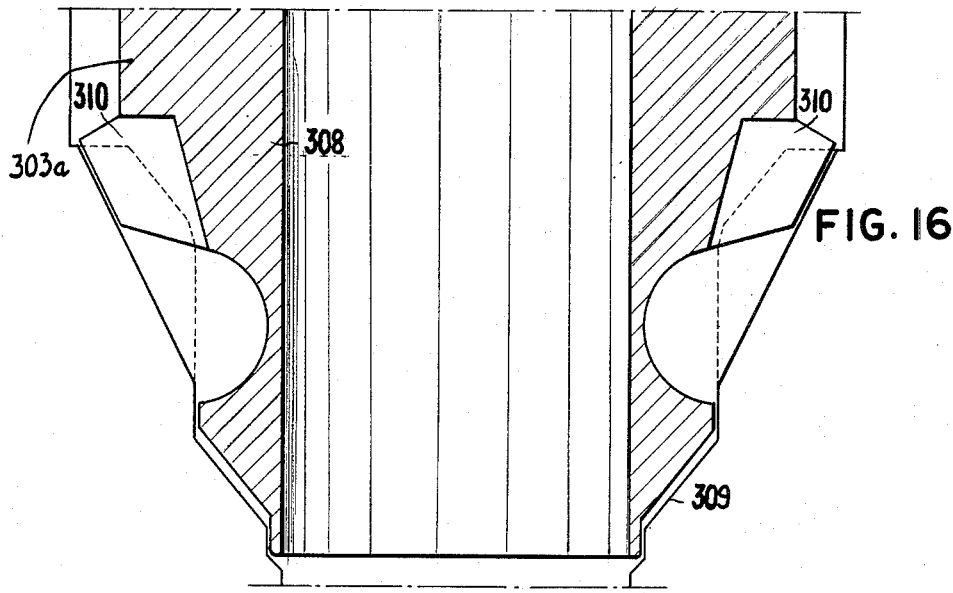
Figure 17:
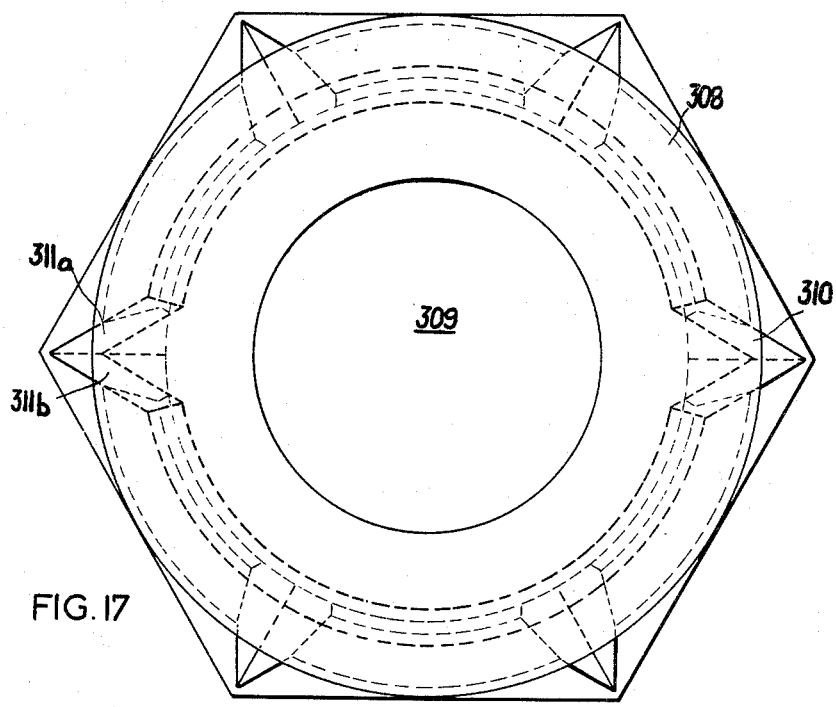

In the accompanying drawings:

FIG. 1 is a diagrammatic vertical sectional view of a nuclear reactor,

FIG. 2 is a partial top view of the reactor core which is represented in FIG. 1, FIG. 3 is a vertical sectional view illustrating the kinematics of the frame and of the deformable system supported by said frame, FIG. 4 is a sectional view taken along the lines IV—IV of FIG. 3, FIG. 5 is a vertical sectional view of the device as represented diagrammatically in a first form of embodiment, FIG. 6 is a view taken in perspective illustrating an element of the device which permits of the opening movement and orientation of the deformable system, FIG. 7 is a vertical sectional view of another form of embodiment of the device, FIG. 8 is a sectional view of an alternative form of the device represented in FIG. 7, FIG. 9 is a sectional view taken along the line IX—IX of FIG. 8, FIG. 10 is a view taken on a larger scale illustrating the detail of construction of a safety unit mounted on the device, FIG. 11 is a sectional view illustrating another safety system, FIG. 12 is a sectional view taken along the line XII—XII of FIG. 11, FIG. 13 is a diagrammatic view of one portion of the reactor of FIG. 1 employing a handling device constructed in accordance with another form of embodiment, FIGS. 14 and 15 represent in vertical cross-section and on a larger scale the device in accordance with the form of embodiment of FIG. 13, FIG. 16 is a vertical sectional view of the centering stop which is provided at the bottom extremity of the frame of the device, FIG. 17 is a top view representing the centering stop and the top portion of a channel located at the level of a fuel access tube.

FIG. 1 represents in vertical cross-section a diagrammatic view of one example of nuclear reactor which employs for the loading or unloading operation of the fuel elements a handling device in accordance with the invention. As can be seen in this figure, the reactor comprises a central portion or core 1 which is constituted, for example, by a stack of graphite columns 2 bored vertically so as to form longitudinal channel 3. The core rests on a horizontal bearing-plate 4 which is supported by posts such as the post 5 on the bottom of a casing or tank 6 which surrounds the reactor and which is impervious to the coolant. The said coolant, which is admitted in the interior of the tank through an inlet pipe 7 and evacuated through an outlet pipe 8 flows in the case considered from the bottom to the top of the reactor channels, an annular wall 9 being placed between the core and the lateral walls of the tank in order to prevent the coolant from passing directly along the sides of the reactor. The leak-tight containment vessel 6 is surrounded by a layer of heat-insulating material 10 which separates the said vessel from an enclosure 11 of substantial thickness, of concrete, for example, which protects the outer atmosphere against harmful radiations emanating from the reactor core. The said enclosure 11, which is referred-to as a biological shield, is provided at the top portion thereof with a certain number of vertical holes 12 or fuel access tubes (charge tubes), through which is inserted the handling system 13. A loading machine 14 is adapted to move on top of the biological shield and is provided with a protective casing 15 inside which is mounted a handling winch 16 for the purpose of unwinding a cable 17 which carries the entire equipment as will be explained in greater detail in the following description.

The machine is located in the interior of a frame 18 by means of which the said machine can be displaced and brought above the appropriate access tube for the purpose of carrying out a manipulation of the fuel in any part of the reactor. Provision is made at the bottom portion of the casing 15 for a regulating unit 19 which serves to pre-set the loading device 13 by giving this latter a definite orientation prior to its insertion in the access tube concerned.

The reactor is provided at the bottom portion thereof with a series of discharge locks such as the lock 20 which are closed by two valves 21 and 22 and which are intended for the removal of spent fuel cartridges from the reactor. To this end, the latter are passed downwards through certain channels of the reactor which are reserved for the unloading operation and reach an evacuation collector 23 which is connected to one of the locks 20. (Only one of these latter is shown in the drawings for the sake of clarity). It will be understood that this arrangement for unloading from the bottom face of the reactor is in itself entirely secondary, inasmuch as the discharge of fuel elements can be effected without difficulty from the top of the pile. The said arrangement does none the less have the advantage of avoiding the upward conveyance of irradiated elements in the interior of the machine, thereby making it possible to reduce the shielding required for this latter and consequently both the overall size and weight thereof.

One handling zone, that is to say, one group of vertical channels distributed about the axis of the fuel access tube considered, corresponds to each of the access tubes 12 which pass through the biological shield of the reactor. The handling device 13 which is introduced inside the access tube must in fact be capable of carrying out the loading or unloading of a number of channels, these latter being disposed symmetrically so as to ensure that the handling gripper which is carried by the device is able to reach each channel in succession while carrying out only a radial movement or a general rotational movement about the axis of the fuel access tube. The entire assembly of reactor channels is thus subdivided into adjacent zones which can be partially interconnected, so that certain channels can be serviced, for example, from two adjacent access tubes.

There has been shown in FIG. 2 a simplified top view of a portion of the reactor which especially comprises a handling zone of the type mentioned above. The moderator rods 24 which are placed one over the other and constitute the columns 2 of the stack have in the example considered a hexagonal transverse cross-section. The longitudinal axes of the columns are consequently distributed in a triangular lattice with a uniform pitch. The handling zone proper corresponds in the present case to thirty one channels, that is to say one central channel surrounded by thirty channels. Each channel is represented in the figure by a small circle located at the center of a rod. It will be understood that the diameter of each channel is in fact larger than that of the above-mentioned circles, as shown, for example, by those which are designated by the reference 25 and which are formed axially through the various rods 24. The combined assembly of thirty channels is divided around the central channel 26 into six unitary zones such as the zone 27. Each unitary zone which is shown in shaded lines in the figure comprises five channels, that is to say, in fact groups together five adjacent columns, the location of the channels being designated by the references a, b, c, d, e. The following unitary zone groups together in its turn five channels, the location of which is designated by the references a', b,' c', d', e' and so forth.

As has already been stated in the foregoing, there corresponds to each handling zone one fuel access tube which is located vertically above the central channel of the zone. In the example represented in FIG. 2, the central channel of the zone is accordingly located directly above the channel 26. The handling device which is introduced in the interior of the access tube considered must accordingly be capable in the form of embodiment which follows below of servicing each of the above-mentioned unitary zones in succession and then, within each zone, any one of the five channels which are grouped together in that zone.

The transition from one unitary zone to the following zone will be effected by means of a movement of rotation of the device through an angle of 60°, inasmuch as the channels $a$, $a'$ and corresponding channels of the other zones are distributed in six directions symmetrically about the axis of the central channel. In each unitary zone individually, the loading device must be capable of performing either radial movements of varying amplitude when assigned to channel $c$, or a movement of extension combined with a movement of rotation about the axis so as to bring the handling gripper above the channels $a$ and $b$ or $d$ and $e$ and so as to carry out the handling of fuel in each channel in succession.

To this end and as can be seen in FIG. 3, the loading device, or to be more precise, that portion of the loading device which will be referred-to below as the supporting frame, comprises an external armature consisting of two parts in line with each other and designated in the drawings by the references 30 and 31. The top part 30 has the shape of a box or closed sleeve having in cross-section the shape of a regular polygon which, in the constructional example considered, is a hexagon, as also shown in the sectional view of FIG. 4.

FIGS. 3 and 5 illustrate the construction of the bottom portion 31 of the device and especially the elements constituting the system hereinbefore referred-to as a deformable system for guiding the fuel elements. The said bottom portion is constructed in the form of a rigid upright member which is provided at the base thereof with a closed terminal portion, the cross-section of which narrows in the shape of a cone 32 so as to permit the tip 33 of said cone to engage in the central channel 26 of the handling zone considered. The device can therefore be centered and abuttingly engaged in the axis of the fuel access tube, the portion 33 being inserted in the top portion 34 of the reactor core after the fashion of a centering post and is thus brought to bear on a seating which will be explained in greater detail below and which is formed in the opening of the central channel. The top portion of the upright member 31 terminates in two supports 35 and 36 forming brackets for the purpose of holding in position a stirrup member 37 which is movably mounted about the vertical axis of the device, that is to say, about the axis of the fuel access tube and central channel of the corresponding zone.

To this end, the stirrup member 37 is provided at the top and bottom portions thereof with two supports 38 and 39 which are formed respectively parallel to the supports 35 and 36 of the upright member 31. There is formed in the bottom portion of the said stirrup member 37 a bore designed for the purpose of fitting therein a swivel-pin 40 which rests in a bearing-bush 41 fitted in the support 36, the said swivel-pin 40 being fitted with a fixing nut 42 which locks the stirrup member 37 in position in the vertical direction without preventing the rotation thereof. At the top portion of the assembly, the stirrup member 37 is journalled in the upright member 31 by means of a hollow shaft 43 which extends axially in the interior of the top box 30. The bottom portion of the said shaft 43 is held applied against a bearing 47 by means of a nut 46. The passages through the support and through the upright member of the device are fitted with rings such as the rings 44 and 45 so as to permit without any difficulty the independent rotation about the axis of the combined assembly, either of the stirrup member 37 or of the shaft 43 itself for the orientation of a control cam 90 which is carried by this latter. The shaft 43 is provided longitudinally with an axial bore of suitable diameter so as to provide a passageway for the running of the cable 17 which, as will be brought out in detail below, supports not only the handling grab or gripper but also the entire apparatus as and when this latter is inserted in or withdrawn from the fuel access tube employed.

There are pivotally attached to the stirrup member 37 an assembly of movable link-rods which form a deformable quadrilateral. The said quadrilateral is composed of two link-rods 52 and 53 which are pivoted on the stirrup member 37 about two pivot-pins 50 and 51. The link-rod 52 terminates at that end which is opposite to the articulation 50 in a spacing member 54 which comprises a guide-finger 55, the function of which in conjunction with the orienting cam 90 will be disclosed in the following description. There is provided in proximity to the guide-finger 55 an articulation 56 for a third link-rod 57 having a pivot-pin 58 on which the first link-rod 53 is also pivotally mounted. The link-rod 57 extends beyond the articulation 58 and is fitted at the bottom extremity thereof with a pivot-pin 59 which carries by means of a support 60 a protective carriage 61 which is intended to contain the fuel element during the various handling operations. At the time of operation of the device, the handling cable 17 is guided by two pulleys 62 and 63 carried by two yokes 64 and 65 which are respectively integral with the stirrup member 37 and with the bottom extremity of the link-rod 57, the pulleys being movably mounted at the ends of said yokes about spindles which are designated by the references 66 and 67. At the bottom end of the cable is suspended a gripper or suitable handling device 68, the claws 69 of which are designed to grab the fuel elements such as the fuel element 70 (as shown in FIG. 5) so as to insert said elements in or withdraw them from the channels of the reactor.

The carriage 61 is provided at the top portion thereof with a component 71 which is hollowed-out axially in the shape of a cone 72, inside which is fitted the top portion 73 of the gripper 68 when the cable 17 is drawn upwards through an opening forming a passageway 74 at the summit of the carriage. The said carriage is open at the bottom portion 75 thereof so as to permit of the downward movement or upward movement of the gripper. In the rest position as illustrated in FIG. 5, the carriage is thus practically located in the axis of the central channel.

In order to permit the fuel elements to pass through at the time of loading or unloading of the central channel 26 of the handling zone considered, the terminal portion of the upright member 31 is bored at 76 in the line of extension of the carriage directly beneath the element 70, this latter being guided as the gripper moves downwards by the conical portion 32 up to the opening of the channel.

The top portion of the carriage 60 is also provided with an articulation 78 for an additional link-rod 79 which is coupled at the other end 80 thereof to the link-rod 53. The length of the link-rod 79, that is to say in fact the position of the fulcrum 80 is determined so that, as the deformations of the quadrilateral take place, the carriage should remain constantly vertical.

The loading device must in the example considered, and as has already been stated, make it possible to give a double orientation to the gripper prior to the introduction of this latter inside the fuel access tube, this double orientation corresponding on the one hand to the choice of unitary zone and, on the other hand, to the choice of a channel which is located within said zone.

The first orientation is carried out in a very simple manner by making practical use of the characteristic shape of the top portion of the frame 30, 31. In view of the fact that this latter is hexagonal, it is merely necessary to provide the fuel access tube with a shape which is also hexagonal in order to obtain, as a result of successive rotations through 60°, six possible orientations of the device which each correspond to one of the unitary zones mentioned above.

The second orientation is determined, when once the first has been chosen, by rotation of the cam 90 which is supported by the hollow shaft 43 at the top portion of the upright member 31 and by a counter-cam 92 secured to a small plate 91 which is integral with the upright member. As can be seen in FIG. 6, the cam 90 has the shape of a solenoid of revolution limited by two planes at right angles to the axis of the hollow shaft 43. Provision is made in the external surface of the cam for a series of six grooves having parallel lateral walls and which are respectively designated in the drawings by the references 100 to 105. Each of the said grooves terminates at the top of the cam and these latter are distributed symmetrically about the axis thereof. The counter-cam 92 has an internal opening 93 in which are formed recesses or indentations, the shape of which is designed to permit the abutting engagement of a tooth 94 carried by the spacing member 54 of the link-rod 52.

The operation of the device as a whole can accordingly be readily understood from the foregoing description of the various components thereof. As and when the handling device is introduced inside one of the access tubes of the reactor in order to proceed, for example, to the fuel-loading of any channel of the corresponding handling zone, the choice of that unitary zone to which the channel considered belongs is determined, as has previously been seen, by suitably orienting the box 30 which constitutes the top portion of the frame of the device. This operation is carried into effect inside the loading machine 14 itself by means of the setting ring 19 located at the bottom of said machine. By producing the unwinding of the winch 16 which supports the cable 17, the said frame is lowered into the access tube until the tip 33 of the terminal portion 32 of said frame is engaged inside the central passage 26 of the corresponding handling zone. The device is thus held in position both at the top and at the bottom inasmuch as the top end of the box 30 is brought level with and slightly inside the access tube 12 (as shown in FIG. 1).

As the winch continues to wind-off the cable 17, the carriage 61 is no longer maintained in the locking position by the top extremity 73 of the gripper 68 inasmuch as this latter disengages from the corresponding conical portion 72. The link-rods of the quadrilateral are thereafter no longer retained in their collapsed position, that is to say in that position which results from an upward tractive force applied to the cable, as is the case in particular when the device as a whole is being either lifted or lowered inside the fuel access tubes. The quadrilateral is accordingly free to perform an unfolding movement, the link-rods 52 and 53 having a tendency, under the action of their own weight, to pivot about their articulations 51 and 52. At this stage of operations, the opening of the quadrilateral which is constituted by the link-rods is controlled by the position of the orienting cam 90 against which is applied the tip of the guide-finger 55 which is integral with the link-rod 52. It will consequently be understood that, depending on the respective positions of the grooves 100 to 105 relatively to the guide-finger 55 previously referred to, it will be possible to permit a displacement of more or less substantial amplitude of the link-rod 52 and therefore of the deformable quadrilateral, consequently of the carriage. To this end, the abovementioned grooves have a length which varies from one to another, and the profile of said grooves is either rectilineal or helical with either a left-hand pitch or right-hand pitch, depending on whether it is desired to obtain a radial displacement alone or a radial displacement accompanied by a rotation of the combined assembly either towards the left or towards the right.

As shown in FIG. 6, the counter-cam 92 makes it possible to complete the action resulting from the cam 90 by limiting the downward motion of the link-rod 52 as a result of the abutting engagement in the different vertical recesses formed in the hollowed-out portion 93, of a tooth 94 also carried by the spacing member 54 which is integral with the said link-rod.

If, at the time of introduction of the device in the interior of the reactor, it is desired to load the central channel of the handling zone, the cam 90 is preset in the loading machine by means of the ring 19 in such manner as to bring the groove 100 opposite the guide-finger 55. Since the length of the said groove is extremely short, the link-rod 52 is maintained in the top position as a result of the engagement of the said guide-finger 55 inside the said groove. The unwinding of the cable then permits the gripper 68 to move downwards inside the central channel. If it is now desired to bring the gripper vertically above that channel c which forms part of the unitary zone 27 (as shown in FIG. 2), it being assumed that the box 30 has been previously oriented in the direction of the said zone, it is necessary to cause the cam 90 to pivot about its axis so that the groove 103 is accordingly located in front of the guide-finger 55 of the top link-rod. The quadrilateral then opens out and the carriage 61 is moved outwards radially, the displacement thereof being limited by the abutting engagement of the tooth 94 inside the recess 106 of the counter-cam 92. Similarly, the cam 90 will be oriented in such manner as to employ the grooves 101 and 102 of helical configuration with right-hand pitch for the purpose of servicing the channels d and e, whilst the grooves 104 and 105 with left-hand pitch are employed for the channels a and b. In this manner, each recess of the counter-cam 92 is associated with one groove of the cam 90, and the recesses 107, 108 and 109 thus corresponding respectively to the grooves 101, 102 and 105. It will be noted, however, that none of the recesses of the counter-cam 92 corresponds to the groove 104, since the abutting engagement of the tooth 55 in the bottom of the said groove is alone sufficient to limit the displacement of the link-rods.

The loading or unloading device which has just been described accordingly makes it possible to carry out the selection of the different channels of a handling zone by means of a non-continuous control, the choice of said channels prior to the insertion of the device in the access tube being effected by means of two preliminary adjustments which are carried out inside the handling machine, this latter being located outside the biological shield of the reactor. When once the device has been inserted, the expansion of the system which supports the gripper and the radial opening movement thereof up to a point vertically above the channel thus pre-selected is accordingly carried out by virtue of this arrangement in an automatic and reliable manner, without the aid of any servo-control mechanism. This arrangement additionally makes it possible to carry out the withdrawal of the device by means of an exact reversal of the steps just described, the tractive force applied on the cable as and when this latter is wound onto the winch successively resulting in the upward movement of the gripper, the folding-back of the link-rods of the quadrilateral into their collapsed position and the extraction of the complete device from the fuel access tube.

However, depending on the type of reactor and the mode of operation thereof, provision can be made to carry out the loading or unloading of the fuel, either as in the foregoing example by carrying out the handling of the fuel elements in each zone in a complete manner, that is to say, by working successively on all the channels which are grouped together in that zone before passing to the following zone, or else in a partial manner within each zone by carrying out, for example, the loading or unloading of a certain number of channels located on a circle of pre-determined radius about the axes of the fuel access tubes, then the loading or unloading of a definite number of other channels located on another circle having a different radius and so forth.

In the second case referred to above, the method of loading or unloading which is contemplated requires no more than a single preliminary adjustment of the device inasmuch as the extent of radial displacement of the deformable system is always the same and exactly corresponds to the distance which is necessary for the purpose of servicing, by rotation about the axis of each access tube, a definite number of channels located on a same circle about said axis.

To this end, the deformable system is preferably constituted by two link-rods of equal length which are pivotally attached to the protective carriage, both the said carriage and the link-rods defining together with the bottom member of the polygonal frame of the device the four sides of a parallelogram. The lowering of the device is carried out as in the previous example by means of the handling cable which is coupled at the bottom end thereof to the gripper which is adapted to grasp the fuel elements, the opening and radial displacement of the deformable system being effected in such manner that the bottom extremity of the carriage is brought into abutment with the top opening of a predetermined channel of the handling zone which is located on a circle having a given radius with respect to the axis of the fuel access tube. By virtue of the adjustment which has previously been effected, that is to say, the orientation given to the frame of the device in the access tube prior to being lowered into this latter, it is possible to proceed to the loading or unloading of the channels which are located on this circle, the length of the link-rods and the position of their fulcrums being accurately determined as a function of the radius of said circle.

In this solution, there naturally corresponds to each handling radius at least one device having perfectly defined characteristics, or in other words, the loading or unloading operations call for the use of a number of different devices depending on the dimensions of the handling zones and the number of channels which are grouped together therein. It should be noted in this connection that each of the above-mentioned devices can be assigned to as many channels as there are sides to the polygon which forms the transverse cross-section of the fuel access tube. In any case, such an increase in the number of devices constitutes only an apparent drawback which is largely compensated by the advantages which are gained as a result of the ease of construction of these devices, the small bulk thereof, the reduction in size of associated handling machines, and so forth.

It will be understood that a number of devices can be employed which work simultaneously in parallel in the interior of the reactor through a number of access tubes with a view to carrying out, for example, the handling of fuel in a number of zones at the same time, the said devices being adapted to work in circles of identical radius or of different radius.

As can be seen in FIG. 7, the handling device as constructed in accordance with this alternative form is fitted at the top with a sleeve 110 which is a regular polygon in transverse section, for example a hexagon similar to that shown in FIG. 4. The sleeve is downwardly extended by an upright member 110a which is open so as to permit the lateral movement of the protective carriage and the link-rods supporting this latter. The upright member 110a terminates at its bottom extremity in a centering stop 111 which is intended to be brought to bear inside the top orifice of the central channel which is located in the axis of the access tube in which the device is inserted. The stop 111 is fitted internally with a stationary cylindrical tube 112, the top portion 113 of which is flared in the shape of a cone frustum in order to facilitate the guiding of the fuel elements at the time of handling of these latter in the central channel of the zone considered. The handling cable 114 is fitted at the bottom end with a gripper or handling clamp 115 which carries a fuel element 116 as represented diagrammatically in the figure, the combined assembly of gripper and fuel element being placed inside the protective carriage 117 which is maintained in the position shown in full lines by virtue of the upward tractive force applied on the cable 114. The said cable is engaged in the grooves of two pulleys. The first pulley 119 is movably mounted on a pin 118 fitted in a yoke 120 which is integral with the sleeve 110. The second pulley 121 is mounted on a pin 122 carried by a bracket 123 which is integral with the top portion of the carriage 117.

In order to permit of the radial movement of the said carriage, the deformable system is in this case composed of two link-rods 124 and 125 having the same length, which are pivotally attached to the upright member 110a which forms an extension of the sleeve 110 about the pivot-pins which are respectively designated by the references 126 and 127. The link-rods 124 and 125 are pivoted at the other extremities thereof about pivot-pins 128 and 129 along one of the lateral edges of the carriage 117, the combined assembly of link-rods, upright member and carriage thus defining a deformable parallelogram.

The operation of the device can readily be understood from the foregoing. Accordingly, the introduction of the device in the interior of any fuel access tube having been carried out after a preliminary adjustment which consists in choosing any one of six possible orientations of the hexagonal sleeve 110 in the interior of the said access tube, the device which is suspended from the bottom extremity of the cable 114 is lowered until the centering stop 111 is brought to bear on the top portion of the central channel. The unwinding of the cable then permits the lowering of the parallelogram formed of link-rods and the opening of the articulated system. The carriage accordingly takes up the position which is represented in chain-dotted lines in the figure, whilst the bottom portion 117a of the carriage comes into abutment with and is centered on the top extremity 130 of the channel concerned. The opening movement of the bottom link-rod 125 is also intended to be limited by means of an auxiliary stop 125a carried by the main stop 111, the said auxiliary stop in fact only constituting a safety measure inasmuch as the falling movement of the carriage is interrupted by the top portion of the corresponding channel before the link-rod 125 comes into contact with the stop 125a.

Inasmuch as the lengths of the link-rods are pre-determined, the bottom portion of the carriage comes into position directly above the channel which has been selected, the latter part of the travel of the carriage being effected substantially parallel to the axis of said channel. Since the said channel is located on a circle having a radius which corresponds to the opening distance and radial travel of the articulated system, the unwinding of the cable permits the gripper to convey a fuel element downwards or conversely to extract a fuel element from the channel for the purpose of discharging said fuel element, the sequence of operations in this second case accordingly taking place in exactly the reverse order with respect to that employed for the loading process.

In the example chosen, there are uniformly spaced apart in a same handling circle six fuel channels such as a, a' which correspond to each unitary zone 27 of FIG. 2. Each channel can accordingly be serviced by the same device, the transition from one to the other requiring only the initial adjustment of the frame of the device, that is to say the preliminary rotation through 60° of the sleeve 110 about the axis of the fuel access tube prior to its introduction inside this latter.

In the two examples which have just been considered, the link-rods which are employed for the purpose of constituting the deformable unit for guiding and protecting fuel elements must, in order not to interfere with the movements of the protective carriage, be mounted laterally, either on one side only or on each side of the said carriage, with the result that the theoretical transverse dimensions of the device may be increased to a certain extent. Provision can accordingly be made to replace these link-rods by recessed tubular linkrods which surround the carriage without hindering the radial movements of this latter.

FIG. 8 accordingly illustrates an alternative form in which there can again be seen substantially the same components of the same directing unit as those which have already been illustrated in FIG. 7 and especially the bottom upright member 201, the bottom extremity 202 of which is brought into abutment with the opening 203 of the central channel of the handling zone considered, the fuel access tube 204, the handling cable 205 with its guide pulleys 206 and 207. The deformable system itself is in this case constituted by two tubular link-rods 208 and 209 which are pivotally attached respectively at one of their extremities to the upright member 201. At the other extremities thereof, the link-rods 208 and 209 support by means of the pins 214 and 215 the protective carriage 216 which contains the fuel element and which makes it possible by virtue of the radial movement of the deformable system to set the device in a suitable position. By reference to FIG. 9, a clearer understanding may be had of the respective arrangement of the upright member 201, of the link-rod 208 and of the carriage 216 in the collapsed position of the articulated system. The upright member 201 and the tubular link-rod 208 are open on the side so as to permit the release of the carriage 216 at the time of outward expansion of the system, the link-rods 208 and 209 taking up in this case the position which is shown in chain-dotted lines in FIG. 8. It can thus be seen that, by virtue of their embracing shape, the link-rods make it possible to restrict as far as possible the space formed between the exterior of the carriage 216 and the interior of the upright member 201.

FIG. 10 on the one hand, and FIGS. 11 and 12 on the other hand illustrate two particular arrangements which provide improvements in the device by endowing this latter with remarkable safety of operation, even in the case of an accidental break in the handling cable which supports the combined unit consisting of the device and handling gripper. In fact, it is first of all necessary to make provision, in the event of such a break occurring, for a system which is designed to effect the lifting of the link-rods of the deformable system in order to produce the return upward movement both of the system and the frame in the interior of the fuel access tube. The device is provided for this purpose, for example in the form of embodiment represented in FIG. 8, with a metallic ribbon 217, one length of which terminates in a fastening 224 at the top portion of the upright member 201 and is secured against this latter by means of an internal shearing pin 218 which is designed to withstand a predetermined tractive force. The other length 219 of the ribbon is fastened to the top extremity of the tubular link-rod 208 and is fastened at the other extremity of said link-rod 208 around an internal pin 220 which is also designed to shear under a stress which is similar to that which would result in fracture of the pin 218. The two compass-arms 221 and 222 are pivotally attached to two tubular pins 225 and 226 which surround the internal pins 218 and 220, the said arms being joined together about a pin 223 and freely mounted in order not to interfere with the radial movements of the link-rod 208 and consequently of the carriage 216. As and when an accidental break in the cable 205 occurs, the deformable system moves into the position shown in chain-dotted lines in FIG. 8 and, when in this position, can no longer be moved upwards in the interior of the fuel access tube 204. It is then merely necessary to apply by means of a tool or universal pliers a suitable tractive force on the fastening 224 which terminates the metallic ribbon 217 in order to fracture successively the internal pins 218 and 220 and thus permit the said ribbon to come substantially into the position which was previously occupied by the cable 205. It is then possible to fold back the deformable system without difficulty and lift the device out of the reactor.

Whereas the handling gripper supports the fuel element in the interior of the carriage, it is additionally necessary to provide for another safety system which prevents any possibility of the fuel element being released during the movements of transfer of the device or of radial movement of the deformable system. Furthermore, the gripper must deposit or withdraw the fuel element in the channel which has been selected only when once the deformable system has moved into its extended position and when the bottom extremity of the protective carriage is in contact with the top extremity of the channel considered.

FIGS. 11 and 12 illustrate an example of construction of a locking unit which is advantageously mounted on the protective carriage with a view to providing the safety systems referred to above. This unit consists of an internal tongue 227 which is extended at the bottom by an external fork-shaped component 228. The operation of a system of this kind will now be readily understood. In the unlocking position, that is to say in that position which corresponds to the outward extension of the deformable system and to the moving into contact of the carriage against the top extremity of a channel 203 of the reactor, the tongue 227 pivots about its pin 229 and permits the gripper and the fuel element which is carried by this latter to pass out freely. On the other hand, in any other position, that is to say when the fork-shaped member is not applied against the extremity of a channel or against a similar control unit which is necessarily provided in the interior of the loading machine, the tongue 227 prevents any possibility of downward movement of the fuel element without thereby preventing the upward movement thereof (as shown in FIG. 8).

The system which has just been described also provides an additional safety feature in the case of abnormal operation, especially in the event of a break in the cable 205 or in the event of accidental opening of the claws of the gripper 230. If the fuel element is constituted by a canned rod which is held axially at the center of an annular jacket 231 of graphite, for example, this latter comes into position between the carriage 216 and the internal tongue 227 in the locked position, by making the unlocking of this latter impossible at the moment when the carriage comes into contact with the top extremity of the channel 203. The tongue 227 which is engaged inside the tubular jacket is unable in this position to perform a pivotal movement and to withdraw.

In all the previous examples, it can be observed that the frame of the device and the deformable system supported by said frame do not constitute during their various movements of transfer or radial displacement a sealed articulated conduit which makes it possible, for example to combat the well-known phenomenon of escape of fuel elements as a result of backlash. In fact, if the direction of the main coolant flow is that which is envisaged in FIG. 1, that is to say, from the bottom upwards through the reactor channels, it may prove necessary in order to prevent escape of fuel elements to make provision at the top of each channel for flow-limiting devices which reduce the pressure of the coolant applied on the fuel elements. In order to avoid the presence of such systems, however, it is sometimes preferable to make use of a back pressure of fluid in each channel while handling operations are in progress, the said back pressure being readily achieved if the loading arm or more generally the device for handling the fuel elements is provided with a sealed conduit from the top end of the channel considered down to the bottom end of the corresponding fuel access tube.

In another form of embodiment, the present invention makes it possible to obtain a sealed conduit as referred-to above, the deformable system with link-rods of the previous examples being replaced by a deformable coupling sleeve which extends automatically after lowering into the access tube so as to cover the channel to be loaded or unloaded.

In FIG. 13, there have again been shown the essential elements of FIG. 1, and especially the fuel access tubes such as the access tube 301, 301a . . . which pass through the biological shield of the reactor and the vertical channels such as 302, 302a and 302b which are formed in the moderator material structure and which are intended to receive the fuel elements. The channels 302, 302a, 302b and 309 which are alone represented in FIG. 1, are assumed to form part of a same handling zone, this latter corresponding, for example, to the fuel access tube 301.

FIGS. 14 and 15 then show in greater detail the particular arrangement of the handling device proper, that is to say of the frame and articulated conduit supported by said frame. As can be seen in these figures, this device consists in this example of a sleeve 303 with a downwardly extended portion or upright member 303a which is open on the side, a connector-pipe 304, a slide tube 305 which is adapted to move inside the sleeve 303, a knuckle-joint 306 fixed on the top end of the connector-pipe 304 and opening link-rods such as the link-rod 307.

The deformable conduit which is intended for the purpose of guiding the fuel elements is thus constituted at the top portion by the sleeve 303, by the slide tube 305, then by the knuckle-joint 306 and by the top portion of the connector-pipe 304 and, at the bottom portion thereof, by the connector-pipe 304 itself. The shapes and sizes of these components are such that the conduit formed is substantially fluid-tight, especially in that portion in which the connector-pipe 304 is joined to the internal wall of the slide tube 305, thereby permitting of the injection into the interior of the conduit, of a gaseous counter-flow which prevents the fuel elements from moving upwards under the action of the main coolant flow.

The sleeve 303 of the top portion of the frame also has in this example the shape of a regular polygon in transverse cross-section. If the cross-section of the access tube is also hexagonal as in the previous examples, the engagement of the device inside this latter is carried out with a pre-determined orientation about the axis; this orientation on the one hand can be chosen among the six alternatives which are each pre-determined by means of a movement of rotation through an angle of 60° from one zone to the next and, on the other hand, is maintained during the downward movement of the device inside the reactor by virtue of the lateral walls of the access tube employed.

As shown in FIG. 16, the upright member 303a terminates at the bottom portion thereof in a centering member 308 which serves for the purpose of carrying out the positioning of the device relatively to the head 309 of the central channel which is located directly below the access tube 301; this positioning must be carried out as accurately as possible both in height, in rotation and in two horizontal directions. These four settings can be carried out without ambiguity by means of four "plane on plane" abutments or more exactly, "point on plane" abutments between the member 308 and the head 309, the said abutments being effected and maintained by that portion of the weight of the device which rests on the head 309 of the central channel. As an advantageous feature, the four abutments are effected on the two dihedral surfaces of two lugs such as the lug 310 which are integral with the side walls of the centering member 308. As can additionally be seen in FIG. 17, the two lugs permit of the abutting engagement of the bottom end of the upright member 303a on two of the six oppositely oriented inclined dihedrons, the faces of which such as 311a and 311b, for example, are formed in the head 309 of the central channel.

The slide tube 305 which is placed in the interior of the sleeve 303 is mounted in such manner as to be capable of moving freely in the vertical direction. The internal surface of said slide tube is flared towards the top in the shape of a cone frustum 312 so as to facilitate the insertion of the fuel elements as and when these latter move downwards in the interior of the deformable conduit. There is formed in the said slide tube a groove of revolution 321 in which are adapted to engage the jaws of a pair of grappling tongs (not shown in the drawings) intended to seize hold of the device so as to move this latter either in or out of the fuel access tube 301. The connector-pipe 304 is pivotally attached to the slide tube 305 about a pin 313. The said connector-pipe is constituted by a tube which is open on the side at the top portion thereof so as to provide a passageway for the knuckle-joint 306, the shape of which is so designed that the sliding movement thereof can take place under substantially fluid-tight conditions over a concave bearing surface 306a which is formed in the internal wall of the slide tube 305. The bottom end 314 of the connector-pipe 304 is finally capable of engaging and centering inside the top orifice 315 of a union sleeve 316 forming an extension of the channel 302 in which it is desired to effect the handling of fuel elements (as shown in FIG. 15).

The knuckle-joint 306 is mounted on the connector-pipe 304 about a pin 317, and the link-rods 307 are pivotally attached to the upright member 303a about a pin 318 and are pivotally attached to the connector-pipe about a pin 319. The arrangement of the above components (connector-pipe 304, knuckle-joint 306, link-rod 307) is determined in such manner that the lower extremity 314 of the connector-pipe 304 engages inside the union sleeve 316 with a final displacement parallel to the axis 320 of said union sleeve. To this end, and as shown in FIGS. 13 and 14, the pins 318 and 319 of the link-rods 307 are located in such manner that, when the end 314 of the connector-pipe 304 reaches the top portion 315 of the union sleeve 316, the plane which is defined by the two parallel pins 318 and 319 passes through the point of intersection of the horizontal plane which contains the pin 313 and the plane at right angles to the axis 320 at the extremity of the union sleeve 316.

In the case which is more especially considered in which the preliminary orientation of the frame of the device permits a choice between six different possibilities, the device is capable of servicing from each fuel access tube six channels such as the channel 302 which are equidistant from the central channel 309 and which are disposed at the summits or apices of a regular hexagon. In the general case in which a number of channels greater than six corresponds to each fuel access tube, provision can be made as in the example given with reference to FIGS. 7 and 8 for a number of devices which, with a view to obtaining access to the different channels, differ from each other in the length of their link-rods 307 and/or in the orientation of the external polygonal surface of the sleeve 303 and the centering member 308 with respect to the direction of opening of the connector-pipe 304.

The practical application and operation of the device in the form of embodiment which has been described above can be readily understood from the foregoing and take place as follows:

After having chosen the device having characteristics which are adapted to the requisite channel, that is to say to that channel for which the opening of the deformable conduit permits of access to a previously selected channel, the frame is oriented by a rotation about a vertical axis in one of the six directions which corresponds to the said channel and is then lowered into the fuel access tube considered by means of a cable and gripper, the claws of the said gripper being engaged in the groove 321 of the slide tube 305, whilst the internal surface of the access tube maintains approximately the orientation of the device during the first part of its downward travel. The equilibrium of the various components is then determined in such manner as to ensure that, when the directing unit is suspended from the cable, the connector-pipe 304 is in its collapsed or folded-back position in the interior of the sleeve 303 while the lower extremity 314 of the said connector-pipe is applied against the upright member 303a. The slide tube 305 is thus in its top position as represented in chain-dotted lines in FIG. 14.

The equilibrium referred-to above is modified when the lower extremity 308 of the upright member 303a is brought to bear on the head 309 of the central channel. Accordingly, when the gripper cable continues to be unwound, the slide tube 305 continues its downward travel but the upright member 303a is motionless since it is held at both ends, and consequently the link-rods 307 perform a pivotal movement about their pin 318 and cause the outward displacement, by means of the pin 319, of the connector-pipe 304, the lower extremity 314 of which engages axially inside the top portion 315 of the union sleeve 316 of the channel 302 concerned.

The gripper can then be detached and drawn up through the access tube, the device remaining in the position indicated in full lines in FIGS. 14 and 15.

The handling of the fuel elements is then carried out without difficulty, the fuel grab and the elements themselves being successively guided by the conduit from the access tube towards the channel or conversely.

When once the operations have been completed in the channel considered, it is merely necessary to proceed to the withdrawal of the device from the access tube. In order to work on another channel, two possibilities are afforded: either the following channel forms part of the same handling zone and is located at the same distance from the axis of the fuel access tube as the channel which has just been serviced; a simple rotational movement of the frame of the device outside the reactor makes it possible to gain access to this channel in accordance with the procedure which has been described above; or else the channel is located at a different distance from the axis of the fuel access tube, in which case it is necessary to resort to the use of another device in which the characteristics of opening of the conduit thereof correspond to the said new channel.

What we claim is:

1. Apparatus for handling the fuel elements of a nuclear reactor having a solid moderator core with vertical channels formed in the moderator core to receive fuel elements and having a protective caisson surrounding the core with vertical access tubes passing through the upper part of the caisson, there being fewer access tubes than channels, comprising flexible means passing through a selected one of the access tubes, control apparatus for said flexible means located outside of the caisson, mobile guiding mechanism for the fuel elements, a frame mounted on said flexible means, articulation means connecting said mobile guiding mechanism and said frame, a seat in the core opposite the access tubes, means on said frame cooperating with said seat, said mobile member being retained on said frame by said flexible means when said flexible means supports said mobile member and said frame, means adjustable before entry of said frame in the access tube for determining the opening of said mobile member with respect to said frame when said frame engages said seat and said flexible means are released, the length of said frame being such that said frame remains partially within the access tube when said frame engages said seat and cooperating means between said frame and the access tube determining the orientation of said frame about the axis of the access tube.

2. Apparatus for handling the fuel elements of a nuclear reactor having a solid moderator core with vertical channels in the moderator to receive fuel elements and disposed in a regular geometric pattern with vertical access tubes passing through the upper part of a caisson surrounding the core there being fewer access tubes than channels, comprising a flexible cable, a control mechanism for said flexible cable located outside of the caisson, a frame supported by said flexible cable traversing an access tube, said frame and the access tube being shaped respectively exteriorly and interiorly to guide said frame in orientation about the axis of the access tube, the shape of said frame and of the access tube having the same order of symmetry as the geometric pattern of the channels, a seat receiving the lower part of said frame located beneath the access tubes at the level of the upper ends of the channels, a mobile member for guiding the fuel elements, an articulated system connecting said mobile member and said frame, said articulated system being collapsed with respect to said frame by said flexible cable when said flexible cable supports said mobile member and said frame and preadjustable means for determining the opening of said mobile member with respect to said frame when said frame engages said seat and said flexible cable is released, whereby said mobile member is positioned over a predetermined channel.

3. Apparatus as described in claim 2, said frame fitting in the access tube with play for engagement with said seat for centering and orienting said frame on an axis of symmetry of the geometrical pattern of the channels.

4. Apparatus as described in claim 3 including a container for said mobile member, a grip for a fuel element in said container connected to said cable for movement in the channel on which said container is seated and links forming a parallelogram for said articulated system connecting said container to said frame and maintaining said container in a vertical position during movement of said container with respect to said frame.

5. Apparatus as described in claim 4 including a spring latch blocking the lower end of said container and so constructed and arranged as to be withdrawn to unblocking position only when said container rests on a channel.

6. Apparatus as described in claim 4, including a ribbon having one end secured at the top of said container and having its other end fixed at the top of said frame and compass-arms connected in the middle of said ribbon and connected to an upper one of said connecting links and to said frame by shear means which break upon the application of a tractive force to the end of said ribbon at the top of said frame.

7. Apparatus as described in claim 2, said mobile member and said articulated system being connected to said frame on a vertical axis providing limited movement between said mobile member and said frame and a cam system on said frame controlling the amount of movement of said mobile member with respect to said frame, said cam system being adjusted before introduction of the apparatus in the access tube.

8. Apparatus as described in claim 7 including connecting rods between said frame and said articulated system cooperating with said cam system controlling the amount of opening of said mobile member with respect to said frame for locating said mobile member over different ones of the channels.

9. Apparatus as described in claim 2, said mobile member comprising a plurality of articulated tubes connected end to end, the upper one of said plurality of tubes sliding in said frame, connecting rods for said articulated system connecting the lower ones of said plurality of tubes to said frame and so constructed and arranged that when said frame is seated on said seat, said tubes move away from said frame and are placed on a selected channel providing a continuous conduit between said frame and the channel.

10. Apparatus as described in claim 2 including at least two lugs for said seat forming respectively two dihedrons and at least two reverse dihedrons on the lower part of said frame engaging said two dihedrons.

References Cited by the Examiner

UNITED STATES PATENTS

| | | | |
|---|---|---|---|
| 3,035,994 | 5/62 | Sutherland et al. | 176—30 |
| 3,051,642 | 8/62 | Dent | 176—30 |

FOREIGN PATENTS 868,021  5/61  Great Britain.

CARL D. QUARFORTH, *Primary Examiner.*